Figure 1:
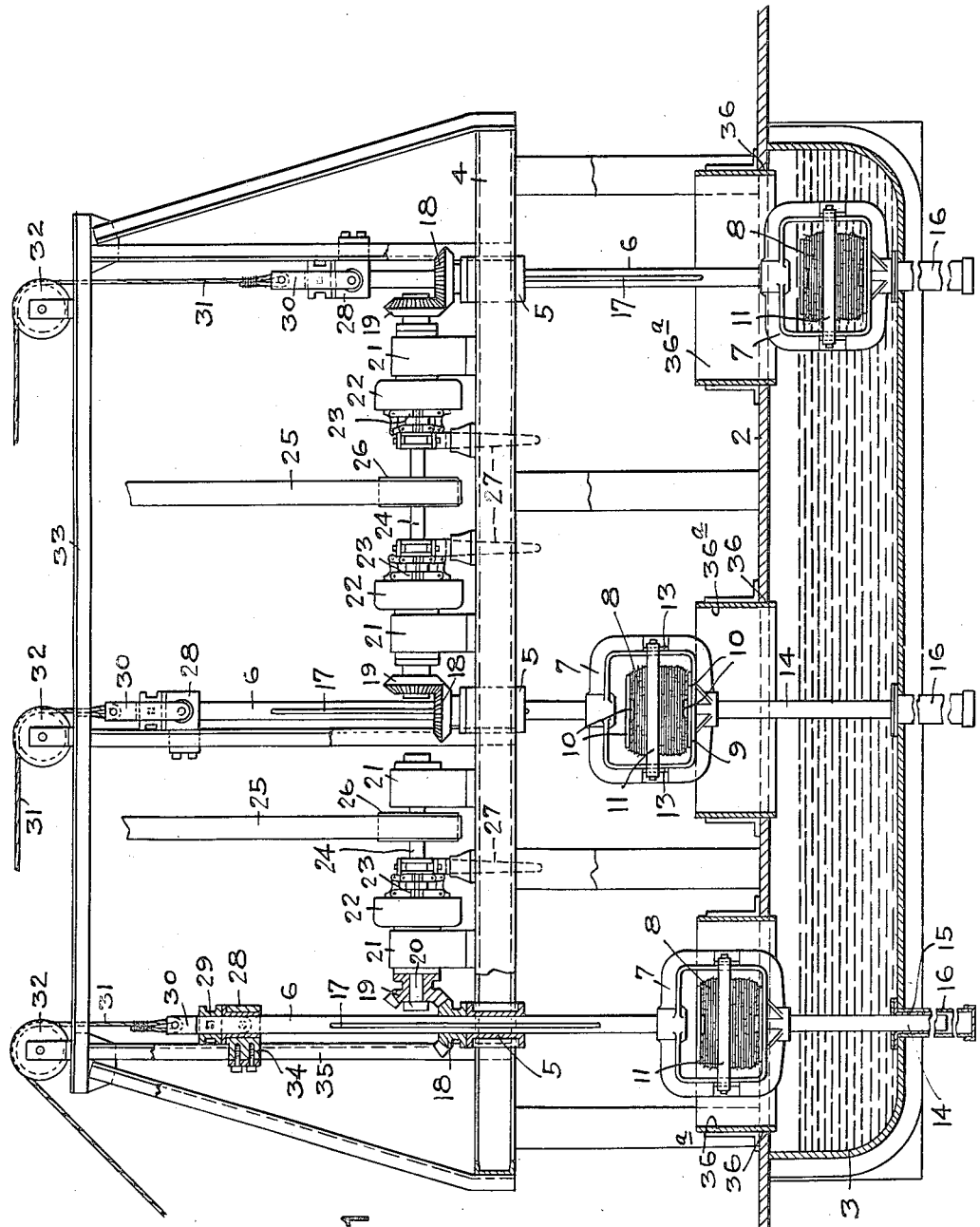

C. J. MOGAN.
APPARATUS FOR PAINTING OR COATING WIRE.
APPLICATION FILED OCT. 4, 1915.

1,256,815.

Patented Feb. 19, 1918.
2 SHEETS—SHEET 1.

WITNESSES

INVENTOR

C. J. MOGAN.
APPARATUS FOR PAINTING OR COATING WIRE.
APPLICATION FILED OCT. 4, 1915.
1,256,815.
Patented Feb. 19, 1918.
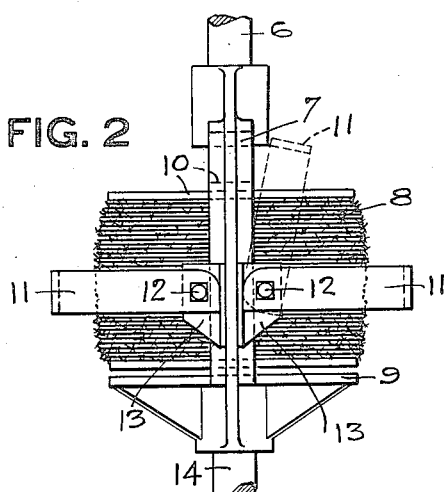
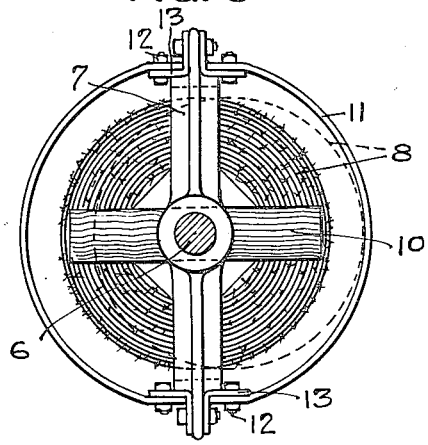
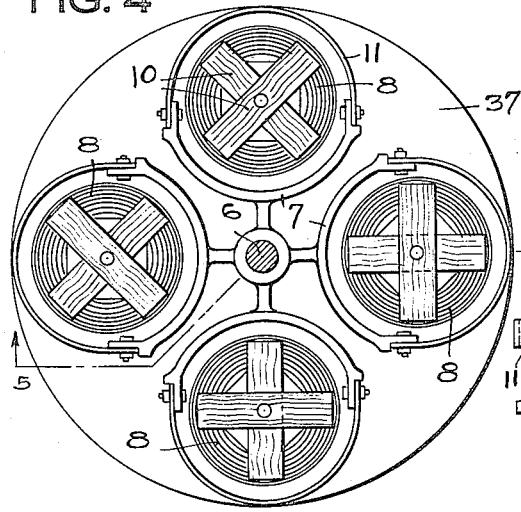
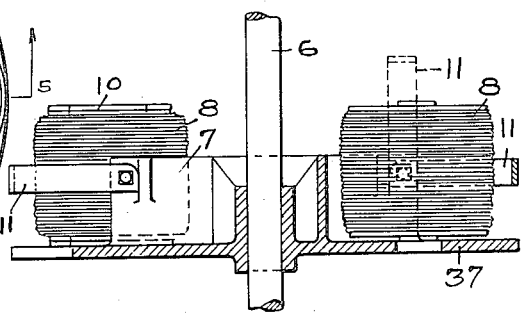

UNITED STATES PATENT OFFICE.

CHRISTOPHER J. MOGAN, OF CHARLEROI, PENNSYLVANIA, ASSIGNOR TO PITTSBURGH STEEL COMPANY, OF PITTSBURGH, PENNSYLVANIA, A CORPORATION OF PENNSYLVANIA.

APPARATUS FOR PAINTING OR COATING WIRE.

1,256,815.  Specification of Letters Patent.  Patented Feb. 19, 1918.

Application filed October 4, 1915. Serial No. 53,942.

*To all whom it may concern:*

Be it known that I, CHRISTOPHER J. MOGAN, a citizen of the United States, and resident of Charleroi, in the county of Washington and State of Pennsylvania, have invented a new and useful Improvement in Apparatus for Painting or Coating Wire; and I do hereby declare the following to be a full, clear, and exact description thereof.

My invention relates to a machine for coating wire, such as plain or barbed wire after it has been wound upon the reel, although its application may be extended to other uses to which it may be found to successfully apply.

The object of my invention is to provide a simple and efficient form of apparatus which will greatly facilitate the slow and inefficient means heretofore employed for this purpose as well as reduce the waste of paint or coating material to a minimum.

The invention comprises, generally stated, a vat for the paint or coating material, a rotary support for the reel of wire, means for raising and lowering the support from the vat, and means for collecting the paint, which is thrown off by the centrifugal action, and delivering the same back to the vat.

The invention relates more specifically to the carrying and supporting mechanism of the machine for applying the coating material to the wire.

In the accompanying drawings, Figure 1 is a view in elevation, partly in section, of my improved apparatus; Fig. 2 is an enlarged view of the support for the reel and the manner of holding the reel in position; Fig. 3 is a plan view of same; Figs. 4 and 5 show a modified form of my invention.

In the drawings, the numeral 2 designates the mill floor, and located below the floor level is the vat 3, which contains the paint or other coating material. The frame 4 is erected on the floor above the vat, and said frame has the vertical bearings 5 to receive the vertical shafts 6. Each shaft 6 carries at its lower end the yoke-frame 7, which supports the reel 8, said frame having the platform 9 upon which the reel rests. These reels may be the ordinary wooden reels, such as are commonly employed for transporting barbed wire, and made up of cross-pieces 10. In order to hold the reels in position on the platform 9 when the yoke-frame 7 is rotated, I provide the swinging guards 11, which are pivotally connected by the bolts 12 to the flanges 13 on the yoke-frame, and which are preferably adapted to move by gravity to a horizontal plane in guarding position.

Extending down from the bottom of the yoke-frame are the shafts 14, which pass through stuffing boxes 15 down into the guides 16 below the vat 3.

The shaft 6 has the feather or key 17 thereon, which engages a key-way in the bevel-gear 18. Rotary motion is imparted to the shaft 6 by the bevel-gear 19 meshing with the bevel-gear 18, said bevel-gear 19 being mounted on a shaft 20 mounted in bearings 21 on the frame 4. The shaft 20 has the clutch-member 22, which is adapted to be engaged by a suitable clutch-member 23 on the shaft 24. The shaft 24 is driven by the belt 25 and pulley 26. A clutch-lever 27 is adapted to throw the clutch into or out of engagement. As this clutch mechanism is of ordinary, common construction, it has not been deemed necessary to describe the same in detail. Any suitable form of clutch may, of course, be employed.

The shaft 6 passes up through the guide-block 28, and at the upper end of said shaft is the head 29, which is swiveled on said guide-block and permits of the rotation of the shaft 6 independently of said guide-block. Straps 30 are connected to the guide-block 28 at each side thereof, and at the upper end of said straps is connected the rope or cable 31, which passes over the sheave 32 on the elevated frame 33. The cable 31 may pass to a suitable winding drum whereby the shaft 6 carrying the yoke-frame 7 may be raised or lowered for the purpose more fully hereinafter set forth.

The guide-block 28 has the tail portion 34, which moves in the guide 35. The floor 2 has the openings 36 surrounded by the dash-plates 36ª which direct the paint discharged by the centrifugal action back into the vat.

In the operation of the device as thus described, the wire to be coated and mounted on the reel is placed in the yoke-frame 7 when said yoke-frame is in the elevated position indicated at the center of Fig. 1, said yoke-frame having been elevated by its cable 31 to this position. One of the guards 11 is first elevated to permit of the insertion of the reel into the yoke-frame 7, resting upon the platform 9 thereof. The yoke-frame is then lowered into the vat 3 and the reel immersed in the paint contained therein. The reel is allowed to remain in this position until the paint has had an opportunity to find its way well into the internal coils of the wire, whereupon the shaft 6 is raised bringing the yoke-frame into the position indicated at the left, Fig. 1, whereupon by operating the clutch-lever 27 the shaft 20 is rotated and through it, rotary motion is imparted to the vertical shaft 6 and the yoke-frame carried thereby. By this rotation of the yoke-frame, a centrifugal action is imparted, which throws the paint outwardly, and the paint is thus forced between the coils of wire and the distribution of the paint throughout the coil is obtained, while, at the same time, the excess paint is thrown by this centrifugal action out against the inner walls of the shields 36ª, whence it drips down into the vat 3. When the paint has been thoroughly distributed in this manner, the shaft 6 is raised again to the position indicated at the center of Fig. 1, and one of the guards 11 is lifted and the reel removed therefrom and another one substituted in its place, whereupon the operation above described is repeated.

In this manner I provide for the thorough distribution of the paint throughout the coils of the wire, and at the same time, by the centrifugal action, throw off the excess paint which drips back into the vat to be used again; and furthermore, the rapid rotation of the reel tends to dry the paint. One attendant can attend to a machine of the character illustrated in Fig. 1, the idea being to have one reel immersed in the tank, one raised within the shield, and the other in the elevated position where the yoke-frame is in position to be charged with a new reel.

In Figs. 4 and 5, I have illustrated a modified form of my invention in which four yoke-frames may be mounted on a rotary disk or platform 37 so that four reels may be operated on at one time.

What I claim is:

1. In a reel support for coating reels of wire or the like, the combination with a coating vat, of a rotary reel carrying frame adapted for vertical reciprocation into and out of the vat, said frame having a movable portion normally retaining the reel on the frame during rotation thereof, said portion adapted to be moved for the insertion and withdrawal of the reel from the frame.

2. In a reel support for coating reels of wire or the like, the combination with a coating vat, of a rotary frame for the support of the reel journaled in bearings above and beneath the vat, and adapted to reciprocate into and out of the vat, said frame having a movable guard member adapted to lie circumferentially of the reel to support the reel against lateral displacement during rotation of the frame.

3. In a reel support for coating reels of wire or the like, the combination with a coating vat, of a rotary frame for the support of the reel journaled in bearings above and beneath the vat, and adapted to reciprocate into and out of the vat, said frame having a pivoted guard member adapted to lie normally circumferentially of the reel to support the reel against lateral displacement on the frame, and adapted to be swung on its pivot for the insertion and withdrawal of the reel from the frame.

4. In a reel support for coating reels of wire or the like, the combination with a coating vat, of a rotary frame for the support of the reel journaled in bearings above and beneath the vat, and adapted to reciprocate into and out of the vat, said frame having a guard member pivotally connected thereto and adapted to lie circumferentially of the reel to support the reel against lateral displacement on the frame, said guard adapted to be swung on its pivot for the insertion and withdrawal of the reel from the frame.

5. In a reel support for coating reels of wire or the like, the combination with a coating vat, of a reel support adapted to reciprocate into and out of the vat, said support comprising a vertically-disposed yoke frame mounted on bearings above and beneath the vat, and having a seat for the reception of the reel, and a horizontally-disposed guard pivoted to said frame for confining the reel to its seat, said guard adapted to be swung upwardly to permit the insertion and the withdrawal of the reel from the support.

In testimony whereof, I the said CHRISTOPHER J. MOGAN, have hereunto set my hand.

CHRISTOPHER J. MOGAN.

Witnesses:
ROBT. D. TOTTEN,
JOHN F. WILL.